(12) United States Patent
Walker

(10) Patent No.: US 9,786,152 B1
(45) Date of Patent: Oct. 10, 2017

(54) SEPTIC OVERFLOW WARNING SYSTEM

(71) Applicant: John Walker, Gaston, SC (US)

(72) Inventor: John Walker, Gaston, SC (US)

( * ) Notice: Subject to any disclaimer, the term of this patent is extended or adjusted under 35 U.S.C. 154(b) by 118 days.

(21) Appl. No.: 14/860,988

(22) Filed: Sep. 22, 2015

(51) Int. Cl.
*G01F 23/00* (2006.01)
*G08B 21/18* (2006.01)
*G08B 5/36* (2006.01)
*G01F 23/30* (2006.01)
*H01H 35/18* (2006.01)

(52) U.S. Cl.
CPC ....... *G08B 21/182* (2013.01); *G01F 23/0007* (2013.01); *G01F 23/0038* (2013.01); *G01F 23/30* (2013.01); *G08B 5/36* (2013.01); *G01F 23/00* (2013.01); *H01H 35/18* (2013.01); *Y10T 137/8342* (2015.04)

(58) Field of Classification Search
CPC .. C02F 2209/42; G01F 23/00; G01F 23/0007; G01F 23/185; G01F 23/205; G01F 23/242; G01F 23/56; G01F 23/585; G01F 23/64; G01F 23/58; G01F 23/74; G01F 23/0038; Y10T 137/8342; G08B 21/182; H01H 35/18
See application file for complete search history.

(56) References Cited

U.S. PATENT DOCUMENTS

| 3,463,981 | A | * | 8/1969 | Wires | G01F 23/60 |
| | | | | | 318/626 |
| 3,578,755 | A | * | 5/1971 | Bynum | G01F 23/00 |
| | | | | | 73/1.73 |
| 4,348,278 | A | | 9/1982 | Caccia | |
| 4,392,128 | A | | 7/1983 | Young | |
| 4,715,966 | A | | 12/1987 | Bowman | |
| 6,217,752 | B1 | | 4/2001 | Coots | |
| D492,000 | S | | 6/2004 | Festa | |
| 6,879,935 | B2 | | 4/2005 | Keck | |
| 7,731,855 | B2 | | 6/2010 | Dunbar | |
| 2006/0090552 | A1 | * | 5/2006 | Ziegler | G01F 9/008 |
| | | | | | 73/114.54 |
| 2013/0314235 | A1 | | 11/2013 | Rogers | |

FOREIGN PATENT DOCUMENTS

WO    WO2008039135    4/2008

* cited by examiner

*Primary Examiner* — Benyam Haile

(57) ABSTRACT

The septic overflow warning system includes a sensor unit that is adapted to secure itself to a tank lip of a septic tank. The sensor unit includes a float that is adapted to be moved up or down depending upon the waste level inside of the septic tank. Moreover, the float is slideably positioned on a sensor rod that is in wired connection with an alarm module. The alarm module includes a plurality of lights thereon. The plurality of lights collectively indicates the status of the volume of the septic tank via the float. The alarm module is powered via at least one solar cell.

6 Claims, 7 Drawing Sheets

SEPTIC OVERFLOW WARNING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of septic systems, more specifically, a warning system that provides an alarm as to the overflow of a septic tank.

Septic systems are used to process sewage, and utilize a septic tank to temporarily store raw sewage during an initial treatment. The septic tank is used to treat the sewage prior to release via an outlet into a leach field. Occasionally, a septic tank can overflow, which can cause a mess. The device of the present application seeks to provide an alarm that alerts a person of an impending overflow in order to take immediate action to prevent said overflow from occurring.

SUMMARY OF INVENTION

The septic overflow warning system includes a sensor unit that is adapted to secure itself to a tank lip of a septic tank. The sensor unit includes a float that is adapted to be moved up or down depending upon the waste level inside of the septic tank. Moreover, the float is slideably positioned on a sensor rod that is in wired connection with an alarm module. The alarm module includes a plurality of lights thereon. The plurality of lights collectively indicates the status of the volume of the septic tank via the float. The alarm module is powered via at least one solar cell.

These together with additional objects, features and advantages of the septic overflow warning system will be readily apparent to those of ordinary skill in the art upon reading the following detailed description of the presently preferred, but nonetheless illustrative, embodiments when taken in conjunction with the accompanying drawings.

In this respect, before explaining the current embodiments of the septic overflow warning system in detail, it is to be understood that the septic overflow warning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the septic overflow warning system.

It is therefore important that the claims be regarded as including such equivalent construction insofar as they do not depart from the spirit and scope of the septic overflow warning system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
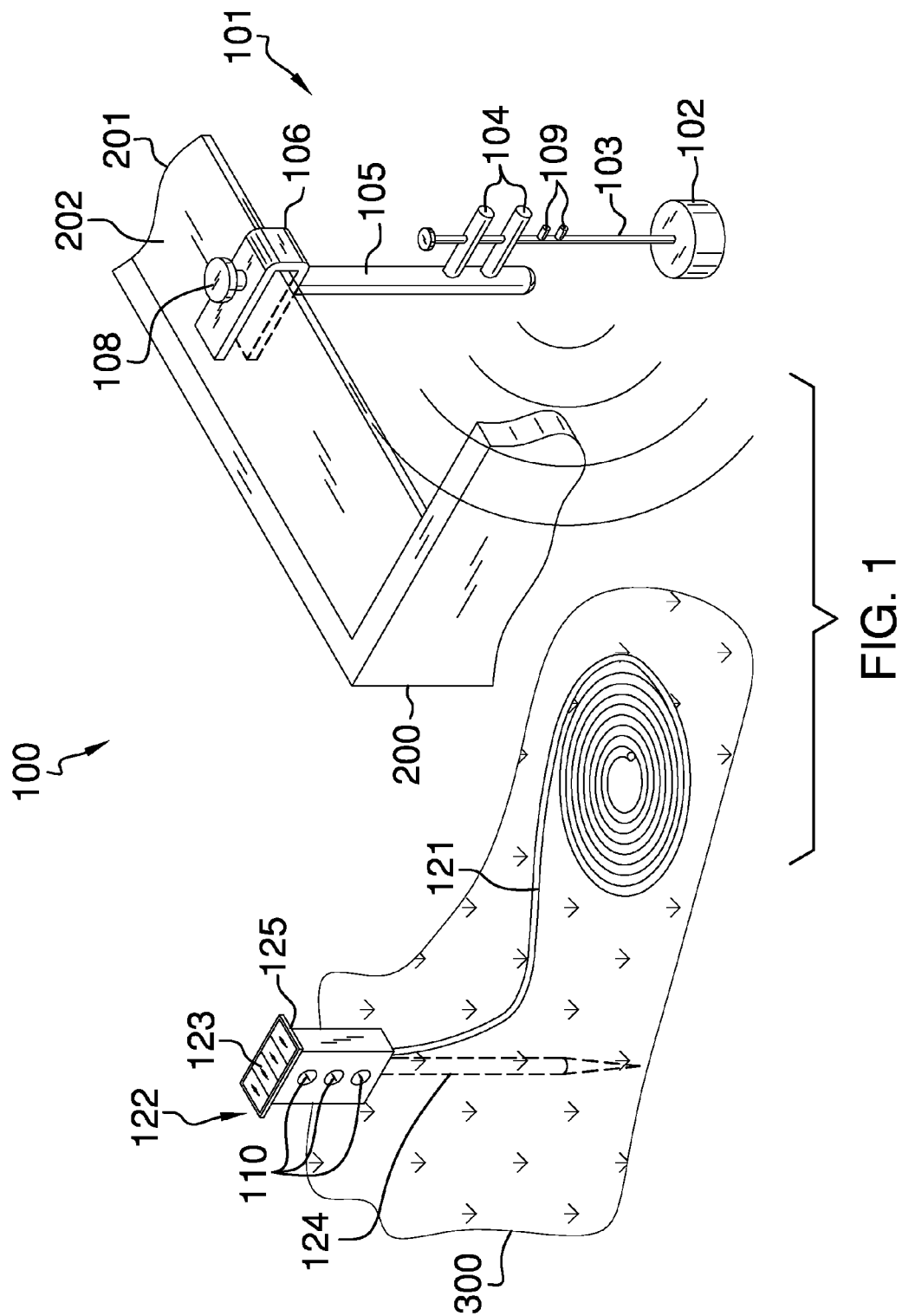
FIG. 1 is a perspective view of an embodiment of the disclosure.
Figure 2:
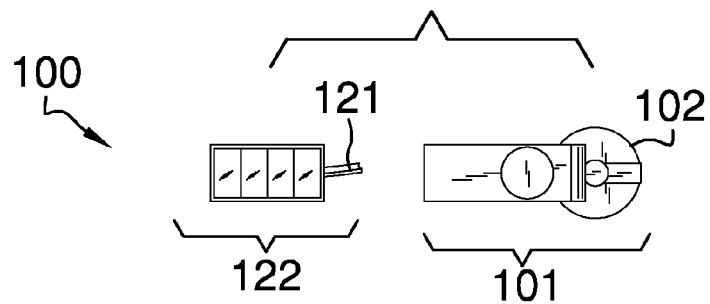
FIG. 2 is a top view of an embodiment of the disclosure.
Figure 3:
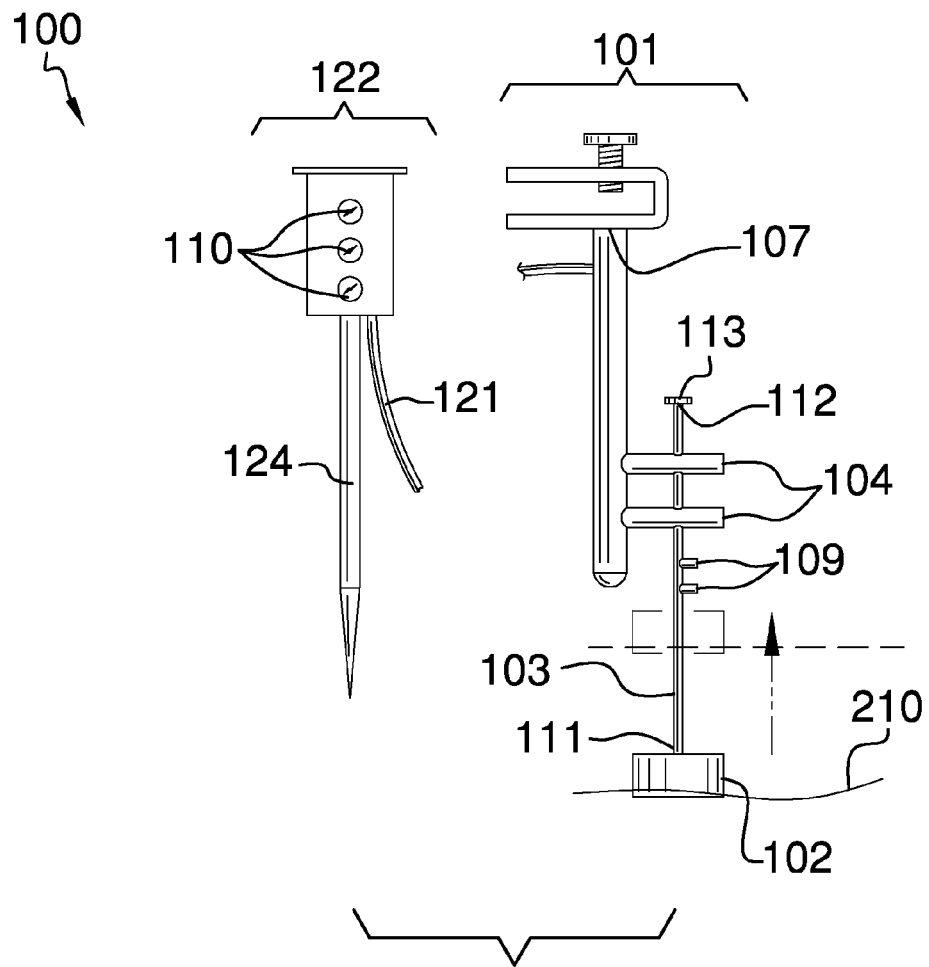
FIG. 3 is a front view of an embodiment of the disclosure.
Figure 4:
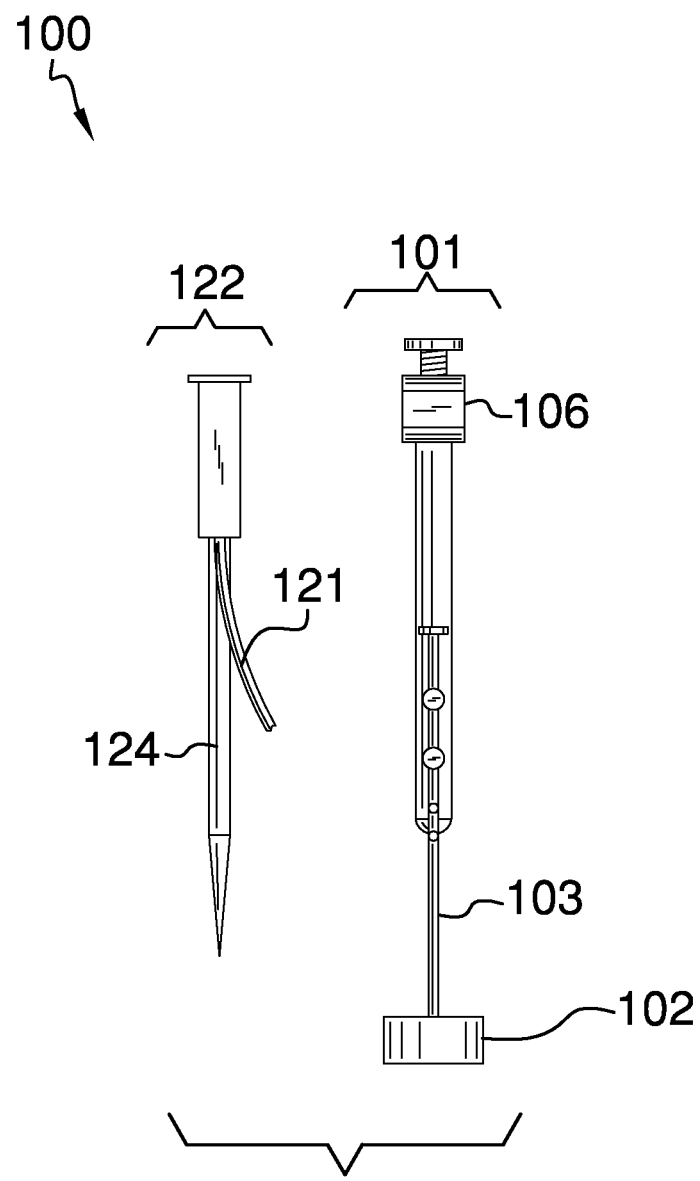
FIG. 4 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 8. The septic overflow warning system 100 (hereinafter invention) comprises a sensor unit 101 that is further defined with a float 102 is affixed to a sensor rod 103. The sensor rod 103 is slideably engaged on a pair of contact sensors 104. The pair of contact sensors 104 protrude outwardly from a bracket arm 105. The bracket arm 105 includes a tank bracket 106 on a distal end 107.

The tank bracket 106 is an elongated "U"-shaped member that includes a tightening screw 108. The tightening screw 108 works with the tank bracket 106 to adaptively secure the sensor unit underneath a tank lip 201 of a septic tank 200. The tightening screw 108 is adapted to interface with a top lip surface 202 of the tank lip 201.

The sensor rod 103 includes a pair of sensor rod protuberances 109. The pair of sensor rod protuberances 109 are generally parallel with one another. Moreover, the pair of contact sensors 104 are generally parallel with one another. The pair of sensor rod protuberances 109 are able to touch one or all of the pair of contact sensors 104 in order to illuminate one of a plurality of lights 110. The float 102 is affixed to the sensor rod 103 at a bottom distal end 111 of the sensor rod 103. Moreover, the sensor rod 103 is further defined with a topmost distal end 112. A rod stop 113 is provided on the sensor rod 103.

The pair of sensor rod protuberances 109 and the rod stop 113 are used to illuminate one of the plurality of lights 110 in order to provide a visual alarm as to a sewage level 210 inside of the septic tank 200. The pair of contact sensors 104 may be further defined with a top contact sensor 114 and a bottom contact sensor 115. Both the top contact sensor 114 and the bottom contact sensor 115 include a rod hole 116 that enables the sensor rod 103 to slide up or down with respect to the pair of contact sensors 104. Both of the pair of contact sensors 104 as well as the sensor rod 103 is cylindrical in shape. The sensor rod 103 has a rod outer diameter 117 that is less than a contact outer diameter 118 of the pair of contact sensors 104.

Figure 5:
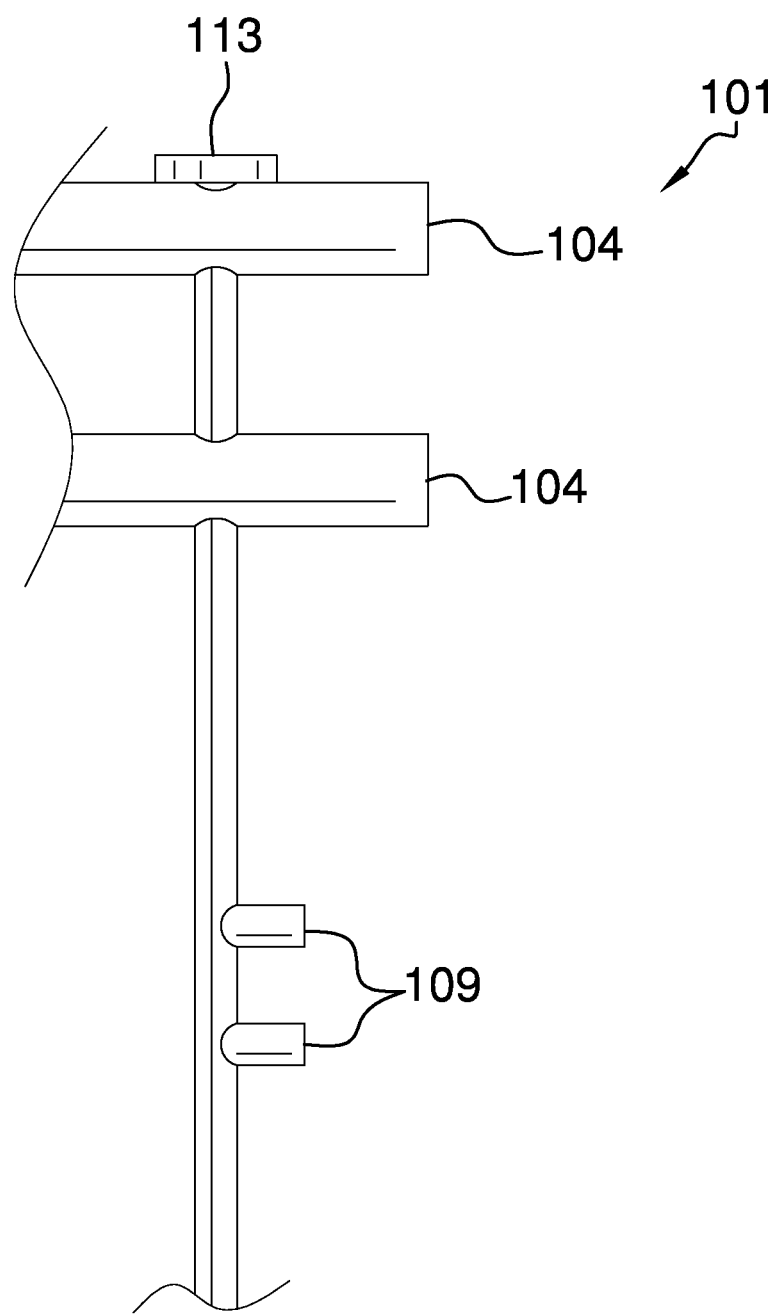
FIG. 5 is a detailed side view of an embodiment of the disclosure.
Figure 6:
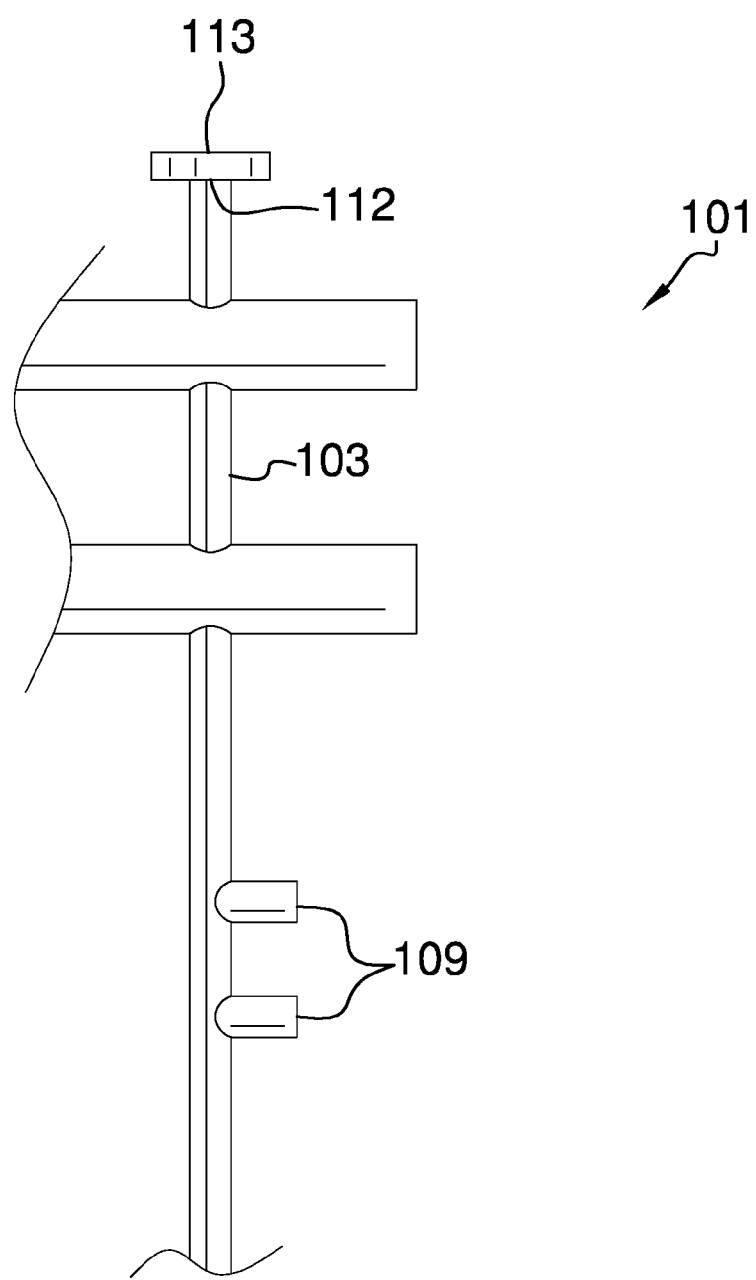
FIG. 6 is a detailed side view of an embodiment of the disclosure.
Figure 7:
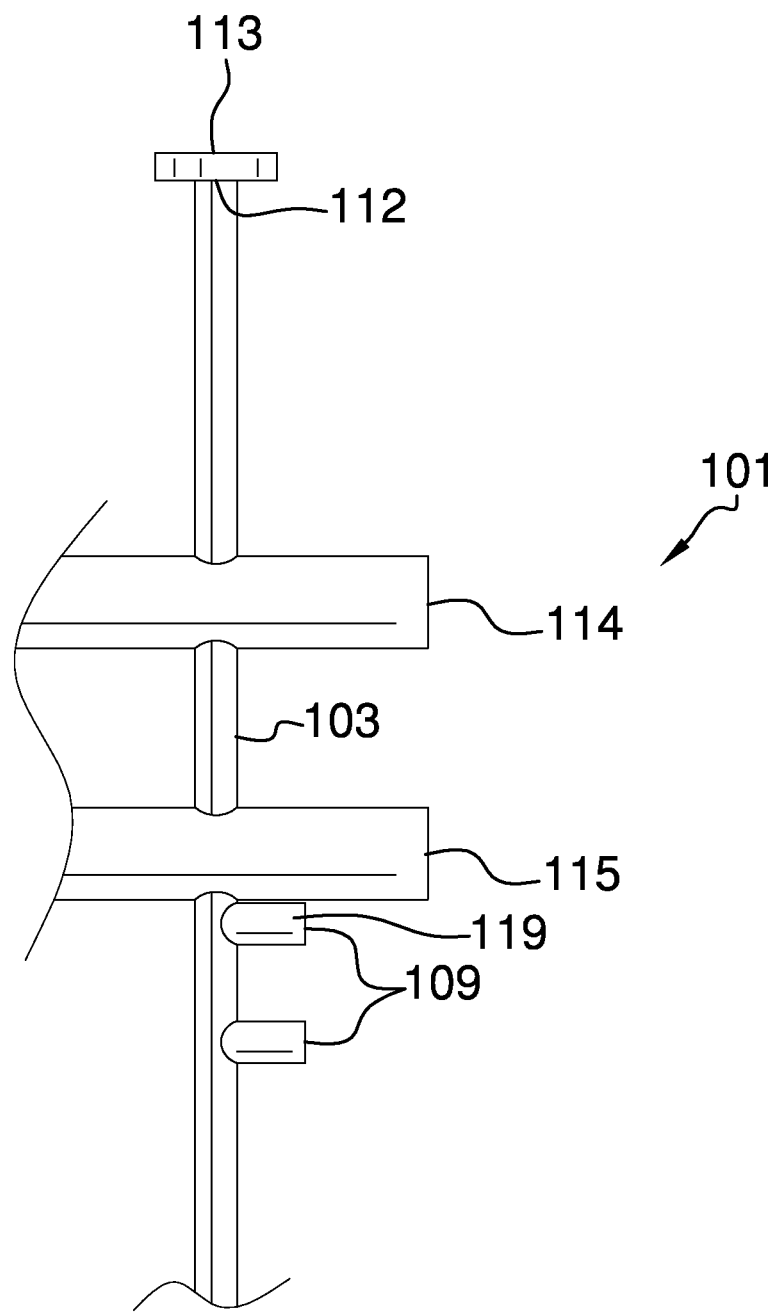
FIG. 7 is a detailed side view of an embodiment of the disclosure.
Figure 8:
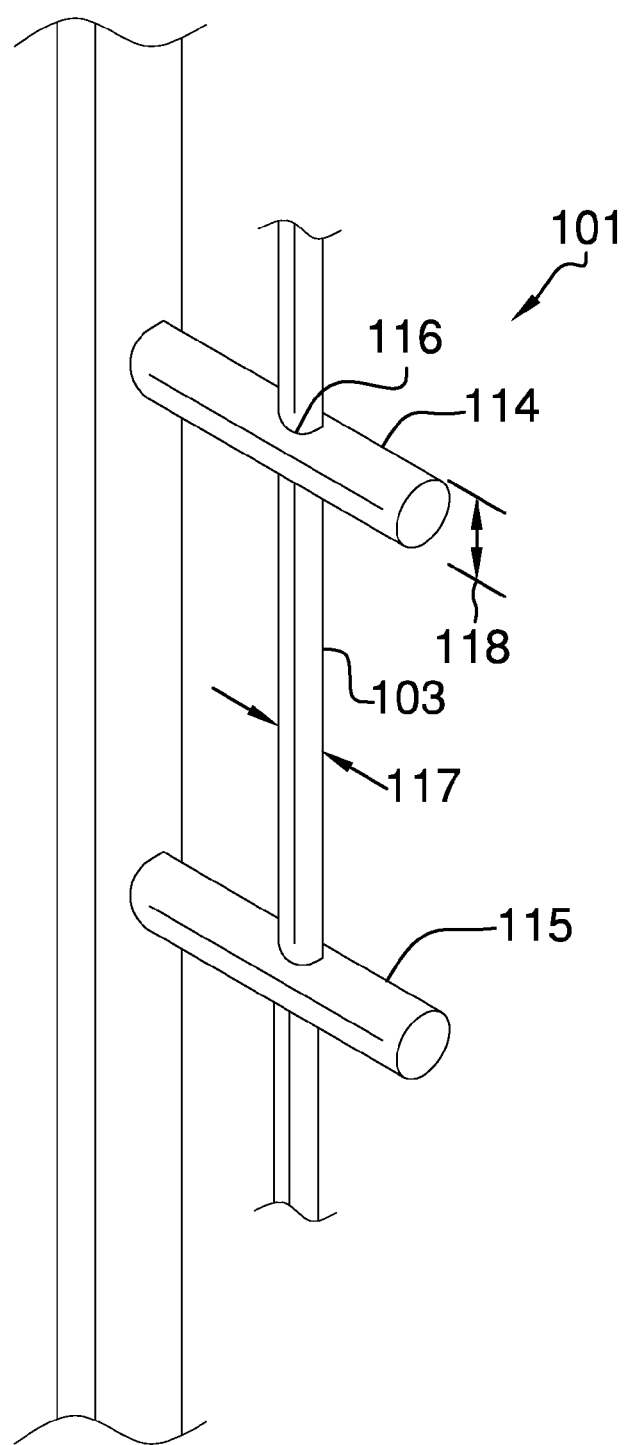
FIG. 8 is a detailed perspective view of an embodiment of the disclosure.

The pair of sensor rod protuberances 109 is further defined with a first protuberance 119. The first protuberance 119 works in concert with the sensor rod 103 and the rod stop 113 to provide 3 different alarm parameters. Referring to FIGS. 5-7, the sensor rod 103 is able to move up and down to close a circuit relative to one of the plurality of lights 110. The bracket arm 105 enables wired connection to occur between the pair of contact sensors 104 and the plurality of lights 110. A wire 121 extends from the bracket arm 105 to an alarm module 122. The float 102 is made of a material that is buoyant, and able to raise the sensor rod 103 upon interaction with the sewage level 210 inside of the septic tank 200.

The wire 121 is of an undefined length, and enables wired connection to occur between the alarm module 122 and the sensor unit 101. Moreover, the alarm module 122 houses the plurality of lights 110. The plurality of lights 110 may involve different colors signifying the level of alarm that is consistent with the level of sewage inside of the septic tank 200. As an example, the plurality of lights 110 may include colors red, orange, and green. A green color would indicate that the septic tank 200 is operating under normal circumstances; whereas orange may heed to being alert; whereas red requires immediate action.

The alarm module 122 may include at least one solar cell 123 and a ground-penetrating stake 124. The at least one solar cell 123 is used to generate electricity that is consumed via the invention 100. Moreover, the at least one solar cell 123 is located on a top module surface 124 of the alarm module 122. The ground-penetrating stake 124 is used to support the alarm module 122. The ground-penetrating stake 124 is adapted to be inserted into the ground 300.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A septic overflow warning system comprising:
   a sensor unit adapted to detect a level of sewage inside of a septic tank;
   an alarm module provides a visual alarm as to the level of sewage detected via the sensor unit;
   wherein the sensor unit is further defined with a float that is affixed to a sensor rod;
   wherein the sensor rod is slideably engaged on a pair of contact sensors;
   wherein the pair of contact sensors protrude outwardly from a bracket arm;
   wherein the bracket arm includes a tank bracket on a distal end;
   wherein the tank bracket is an elongated "U"-shaped member that includes a tightening screw;
   wherein the tightening screw works with the tank bracket to adaptively secure the sensor unit underneath a tank lip of a septic tank;
   wherein the tightening screw is adapted to interface with a top lip surface of the tank lip;
   wherein the sensor rod includes a pair of sensor rod protuberances;
   wherein the pair of sensor rod protuberances are generally parallel with one another;
   wherein the pair of contact sensors are generally parallel with one another;
   wherein the pair of sensor rod protuberances is able to touch one or all of the pair of contact sensors in order to illuminate one of a plurality of lights;
   wherein the float is affixed to the sensor rod at a bottom distal end of the sensor rod;
   wherein the sensor rod is further defined with a topmost distal end;
   wherein a rod stop is provided on the sensor rod;
   wherein the pair of sensor rod protuberances and the rod stop are used to illuminate one of the plurality of lights in order to provide a visual alarm as to said sewage level inside of the septic tank;
   wherein the pair of contact sensors may be further defined with a top contact sensor and a bottom contact sensor;
   wherein both the top contact sensor and the bottom contact sensor include a rod hole that enables the sensor rod to slide up or down with respect to the pair of contact sensors.

2. The septic overflow warning system according to claim 1 wherein both of the pair of contact sensors as well as the sensor rod is cylindrical in shape; wherein the sensor rod has a rod outer diameter that is less than a contact outer diameter of the pair of contact sensors.

3. The septic overflow warning system according to claim 2 wherein the pair of sensor rod protuberances is further defined with a first protuberance; wherein the first protuberance works in concert with the sensor rod and the rod stop to provide 3 different alarm parameters.

4. The septic overflow warning system according to claim 3 wherein the bracket arm enables wired connection to occur between the pair of contact sensors and the plurality of lights; wherein a wire extends from the bracket arm to an alarm module; wherein the float is made of a material that is buoyant, and able to raise the sensor rod upon interaction with the sewage level inside of the septic tank.

5. The septic overflow warning system according to claim 4 wherein the wire is of an undefined length, and enables wired connection to occur between the alarm module and the sensor unit; wherein the alarm module houses the plurality of lights.

6. The septic overflow warning system according to claim 5 wherein the alarm module includes at least one solar cell and a ground-penetrating stake; wherein the at least one solar cell is used to generate electricity that is consumed via the plurality of lights; wherein the at least one solar cell is located on a top module surface of the alarm module; wherein the ground-penetrating stake is used to support the alarm module.

\* \* \* \* \*